United States Patent
Tang et al.

(10) Patent No.: US 10,424,180 B2
(45) Date of Patent: Sep. 24, 2019

(54) BODY FALL SMART CONTROL SYSTEM AND METHOD THEREFOR

(71) Applicant: SUZHOU LING WEI TECHNOLOGY CO., LTD., Suzhou (CN)

(72) Inventors: Jiannan Tang, Suzhou (CN); Yitian Tang, Suzhou (CN)

(73) Assignee: SUZHOU LING WEI TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 16/090,236

(22) PCT Filed: Mar. 16, 2017

(86) PCT No.: PCT/CN2017/076901
§ 371 (c)(1),
(2) Date: Sep. 29, 2018

(87) PCT Pub. No.: WO2017/125094
PCT Pub. Date: Jul. 27, 2017

(65) Prior Publication Data
US 2019/0114895 A1    Apr. 18, 2019

(30) Foreign Application Priority Data

Jan. 22, 2016    (CN) .......................... 2016 1 0042331

(51) Int. Cl.
*G08B 21/04* (2006.01)
*G06T 7/13* (2017.01)
(Continued)

(52) U.S. Cl.
CPC ....... *G08B 21/043* (2013.01); *G06K 9/00362* (2013.01); *G06T 5/002* (2013.01);
(Continued)

(58) Field of Classification Search
CPC .... G08B 21/043; G08B 3/10; G08B 21/0476; G08B 21/0492; G08B 21/182; G06T 7/13;
(Continued)

(56) References Cited

U.S. PATENT DOCUMENTS

| 2006/0001545 A1* | 1/2006 | Wolf ...................... A47K 3/001 340/573.1 |
| 2006/0056655 A1* | 3/2006 | Wen .................... G06F 19/3418 382/103 |

(Continued)

FOREIGN PATENT DOCUMENTS

| CN | 103577836 A | 2/2014 |
| CN | 103903281 A | 7/2014 |

(Continued)

OTHER PUBLICATIONS

Ugur Toreyin et al. (HMM Based Falling Person Detection Using Both Audio and Video, Jan. 1, 2005, computer vision in human-computer interaction lecture notes in computer science;; LNCS, Springer, Berlin, DE, pp. 211-220 (Year: 2005).*

(Continued)

*Primary Examiner* — Mohamed Barakat
(74) *Attorney, Agent, or Firm* — SZDC Law PC

(57) ABSTRACT

A body fall smart control system includes at least one image capturing module used for capturing a video image and an image processing module connected to the image capturing module. The image processing module is used for performing body pattern identification on the captured video image, establishing a 2D or 3D model of the identified body pattern, tracking whether a signal change speed and/or angle of the modeled body pattern reaches a set threshold value to determine whether a fall has occurred, and controlling an alarm module to sound an alarm if a fall has occurred. A 2D or 3D model compares and analyzes the speed, angle, (Continued)

associated help voice, etc. of a falling body to determine whether a fall has occurred, and sounding an alarm and sending a signal for manual braking or automatic braking etc. and controlling an action of a related device if the comparison is successful.

5 Claims, 2 Drawing Sheets

(51) Int. Cl.
    *G06T 7/246* (2017.01)
    *G06K 9/00* (2006.01)
    *G06T 5/00* (2006.01)
    *G06T 5/20* (2006.01)
    *G06T 5/40* (2006.01)
    *G08B 3/10* (2006.01)
    *G08B 21/18* (2006.01)

(52) U.S. Cl.
    CPC ............... *G06T 5/20* (2013.01); *G06T 5/40* (2013.01); *G06T 7/13* (2017.01); *G06T 7/251* (2017.01); *G08B 3/10* (2013.01); *G08B 21/0476* (2013.01); *G08B 21/0492* (2013.01); *G08B 21/182* (2013.01)

(58) Field of Classification Search
    CPC ........... G06T 7/251; G06T 5/002; G06T 5/20; G06T 5/40; G06K 9/00362
    See application file for complete search history.

(56) References Cited

U.S. PATENT DOCUMENTS

2015/0023551 A1* 1/2015 Ramzi ............... G06K 9/00342
    382/103
2017/0365148 A1* 12/2017 Rosenfeld ............. A61B 5/746

FOREIGN PATENT DOCUMENTS

| CN | 103935852 A | * | 7/2014 |
| CN | 103935852 A | | 7/2014 |
| CN | 104574441 A | * | 4/2015 |
| CN | 104574441 A | | 4/2015 |
| CN | 105448041 A | | 3/2016 |
| CN | 104680525 A | | 6/2016 |
| EP | 2757530 A1 | | 7/2014 |
| KR | 20100056711 A | | 5/2010 |
| KR | 20150010248 A | | 1/2015 |

OTHER PUBLICATIONS

Caroline Rougier et al: "Robust Video Surveillance for Fall Detection Based on Human Shape Deformation", IEEE Transactions on Circuits and Systems for Video Technology, Institute of Electrical and Electronics Engineers, US, vol. 21, No. 5, May 1, 2011, pp. 611-622.

Nguyen Viet Dung et al: "An efficient camera-based surveillance for fall detection of elderly people", 2014 9th IEEE Conference on Industrial Electronics and Applications, IEEE, Jun. 9, 2014, pp. 994-997.

* cited by examiner

BODY FALL SMART CONTROL SYSTEM AND METHOD THEREFOR

This application is the national stage application of PCT/CN2017/076901, filed on Mar. 16, 2017, which claims priority to Chinese Patent Application No. 201610042331.0, filed on Jan. 22, 2016, which is incorporated by reference for all purposes as if fully set forth herein.

This application claims priority to Chinese Patent Application No. 201610042331.0, filed on Jan. 22, 2016, which is incorporated by reference for all purposes as if fully set forth herein.

FIELD OF THE INVENTION

The present invention belongs to the body accidental fall monitoring field, and in particular relates to a body fall smart control system and a method therefor.

BACKGROUND OF THE INVENTION

With the rapid development of society, people have many security risks in their daily lives, for example, a stampede accident in a public place, a fall accident on an elevator, an old person falling alone at home but no one knows, etc. These fall accidents are likely to cause injuries, and even worse, loss of valuable lives and so on.

At present, in the field of monitoring falls at home and abroad for the elderly, patients and personnel engaged in dangerous work, most monitoring devices use wearable portable sensors, such as acceleration and angular velocity sensors, or simpler, help call buttons. However, most people are often reluctant to wear various sensor devices. After a person falls, the body cannot move or the brain loses consciousness. In this case, the help call button also fails. Another way to monitor falls is to use traditional camera monitoring to quickly identify a fall. However, the traditional camera is easy to cause misjudgment because it captures single data, and cannot identify people's movements such as bending over. Besides, because the sensor technology used is backward, the accuracy of determination is low, and the error rate is higher in an environment that is dim, at night or hot, etc.

Chinese patent document CN 104966380 discloses an alarm system capable of monitoring an accidental body fall, which comprises a background master unit, a camera unit, a sensing unit and an alarm unit; the camera unit and the sensing unit are responsible for capturing a body video image and a vibration signal; the background master unit is configured to perform framing processing on the body video image to determine whether a fall has occurred and whether the vibration signal exceeds a preset threshold; when it is determined that a fall has occurred and the vibration signal exceeds the preset threshold, an alarm signal is generated to control the alarm unit to sound a responding alarm; through the image identification technology, a fall is determined according to the height of center of gravity, the tilt angle and the effective area change of a person. This patent has the following disadvantages:

1. The accuracy of determining a fall according to the height of center of gravity, the tilt angle and the effective area change of a person is low, and it can be improved by the assistance of a high-sensitivity vibration sensor.

2. When it is determined that a fall has occurred, only a voice alarm can be sounded, and the external device cannot be controlled, with the purpose of rescue basically unachievable.

SUMMARY OF THE INVENTION

In view of the deficiencies of the prior art, an object of the present invention is as follows: The present invention provides a body fall smart control system and a method therefor, i.e., tracking a moving target via a camera and audio signal capturing data, establishing a 2D or 3D model, comparing and analyzing the speed, angle, associated help voice, etc. of a falling body to determine whether a fall has occurred, and sounding an alarm and sending a signal for manual braking or automatic braking etc. and controlling an action of a related device if the comparison is successful. The identification speed is fast, the accuracy is high, and the injury caused by a fall is minimized.

The present invention adopts the following technical solution:

A body fall smart control system is provided, comprising at least one image capturing module used for capturing a video image, and an image processing module connected to the image capturing module, characterized in that: the image processing module is used for performing body pattern identification on the captured video image, establishing a 2D or 3D model of the identified body pattern, tracking whether a signal change speed and/or angle of the modeled body pattern reaches a set threshold value to determine whether a fall has occurred, and controlling an alarm module to sound an alarm if a fall has occurred.

The video image processing of the image processing module comprises the following steps:

(1) detection of moving target: the video image is processed into an image sequence, and it is determined whether a moving target appears in each frame of the image sequence, if so, the moving target is positioned;

(2) tracking of moving target: a correspondence relationship is established between body areas in consecutive frames;

(3) feature extraction method: a contour feature point of the body is extracted to form a contour state of a certain regular shape; and (4) behavior identification: the contour state obtained in the step (3) is subjected to body pattern identification in a space-time zone, a 2D or 3D model is established for the identified body pattern, and a signal change speed of the modeled body pattern is tracked to determine whether the body is in a normal state or an abnormal state; if the body is in an abnormal state, the change speed and/or angle of the contour state in the consecutive frames is analyzed, and it is determined whether the change speed and/or angle reaches the set threshold, if so, a fall is determined to have occurred.

Preferably, image pre-processing is also included prior to the moving object detection, and comprises the following steps: first median filtering is performed on an image to remove image noise; then a boundary contrast adaptive histogram equalization method is used to enhance the image; an open operation is used to remove image burrs that stick to the body; a Prewitt edge detection method is used to extract a contour of the image; and a comprehensive method is used to determine a grayscale threshold of the image, and the image is binarized.

Preferably, the contour state has a rectangular shape.

Preferably, an audio capturing module is also included for capturing an audio signal, and the alarm module sounds an alarm when the audio signal reaches a set threshold.

Preferably, the image processing module is further connected to an execution module that is connected to an external device; when it is determined that a fall has occurred, the execution module is driven to control the external device to stop.

The present invention also discloses a body fall smart control method, which is characterized by the following steps:

S01: at least one image capturing module is used to capture a video image; and

S02: performing body pattern identification on the captured video image, establishing a 2D or 3D model of the identified body pattern, tracking whether a signal change speed and/or angle of the modeled body pattern reaches a set threshold value to determine whether a fall has occurred, and controlling an alarm module to sound an alarm if a fall has occurred.

Preferably, the step (2) comprises the following steps:

S11—detection of moving target: the video image is processed into an image sequence, and it is determined whether a moving target appears in each frame of the image sequence, if so, the moving target is positioned;

S12—tracking of moving target: a correspondence relationship is established between body areas in consecutive frames;

S13—feature extraction method: a contour feature point of the body is extracted to form a contour state of a certain regular shape; and S14—behavior recognition: the contour state obtained in the step S13 is subjected to body pattern identification in a space-time zone, a 2D or 3D model is established for the identified body pattern, and a signal change speed of the modeled body pattern is tracked to determine whether the body is in a normal state or an abnormal state; if the body is in an abnormal state, the change speed and/or angle of the contour state in the consecutive frames is analyzed, and it is determined whether the change speed and/or angle reaches the set threshold, if so, a fall is determined to have occurred.

Preferably, image pre-processing is also included prior to the moving object detection, and comprises the following steps: first median filtering is performed on an image to remove image noise; then a boundary contrast adaptive histogram equalization method is used to enhance the image; an open operation is used to remove image burrs that stick to the body; a Prewitt edge detection method is used to extract a contour of the image; and a comprehensive method is used to determine a grayscale threshold of the image, and the image is binarized.

The advantages of the present invention over the prior art are as follows:

1. Tracking a moving target via a camera and audio signal capturing data, establishing a 2D or 3D model, comparing and analyzing the speed, angle, associated help voice, etc. of a falling body to determine whether a fall has occurred, and sounding an alarm and sending a signal for manual braking or automatic braking etc. and controlling an action of a related device if the comparison is successful. The identification speed is fast, the accuracy is high, and the injury caused by a fall is minimized.

2. The present invention has wide application range and high compatibility, and can be used alone or in a place such as a shopping mall or a public place. When a person falls on an elevator, he/she can be found at the first time, and appropriate braking measures can be taken to avoid casualties.

BRIEF DESCRIPTION OF THE DRAWINGS

The present invention will be further described below with reference to drawings and examples.

Wherein: 1. a camera; 3. an image processing module; 4. an alarm module; 5. an execution module; 6. an external device; 7. a communication module; 31. a receiving module; and 32. a data analysis module.

DETAILED DESCRIPTION OF THE EMBODIMENTS

In order to make the objects, technical solutions and advantages of the present invention clearer, the present invention will be further described below in detail with reference to the specific embodiments and the accompanying drawings. It is to be understood that the description is only exemplary, not intended to limit the scope of the present invention. In addition, descriptions of well-known structures and techniques are omitted in the following description so as to avoid unnecessarily obscuring the concept of the present invention.

Example

Figure 1:
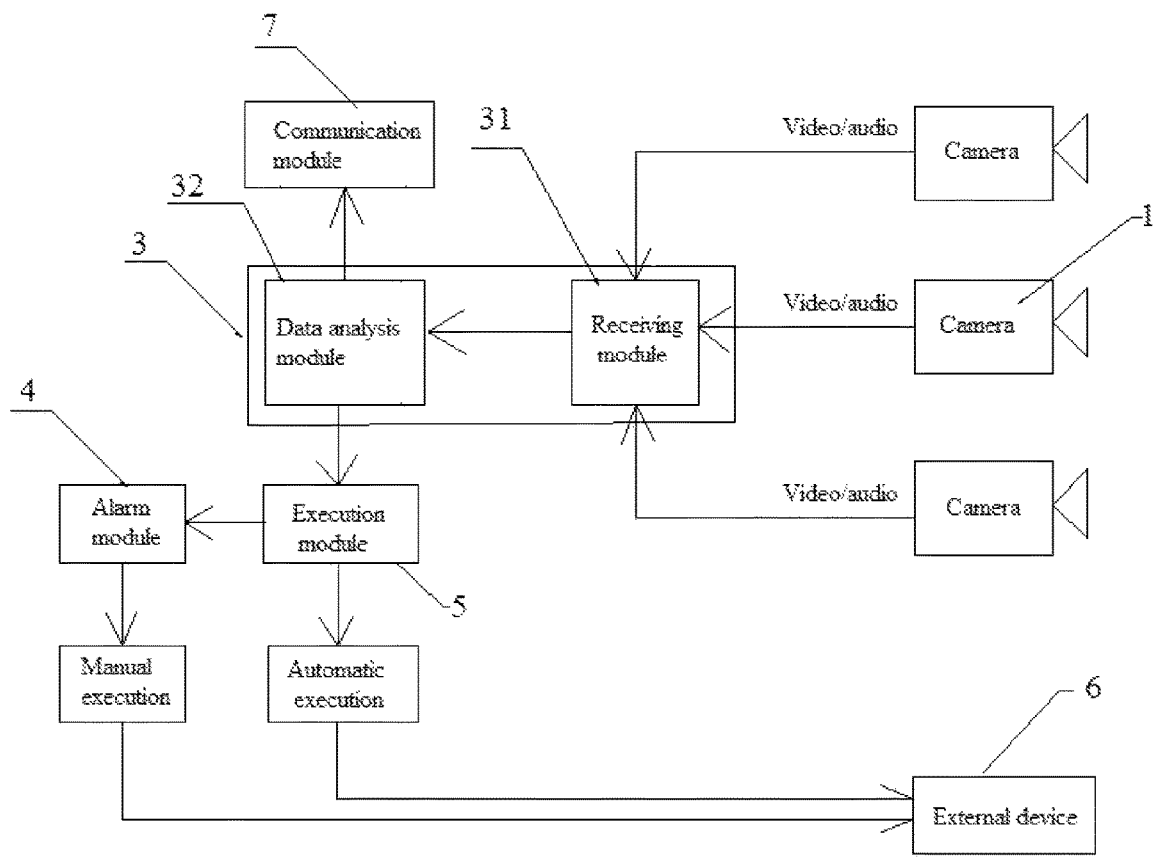
FIG. 1 is a schematic block diagram of a body fall smart control system according to the present invention.

As shown in FIG. 1, a body fall smart control system comprises a plurality of image capturing modules and audio capturing modules, wherein the image capturing module can be a camera 1 and is used to capture a video image, and the audio capturing module is used to capture an audio signal; the image capturing module and the audio capturing module are connected to an image processing module 3, which comprises a receiving module 31 configured to receive the audio or image signal and a data analysis module 32 configured to process and analyze the audio or image signal; if a fall has occurred, an alarm module 4, to which the data analysis module 32 is also connected, is controlled to sound a voice or illumination alarm.

In order to increase the visibility and improve the accuracy of extracting the contour feature points of the body, the present system can also add a structured light emitting module, such as an infrared light emitting module, so that the infrared light illuminates the body to form a body contour reflected light, and then the image capturing module captures the video image.

Figure 2:
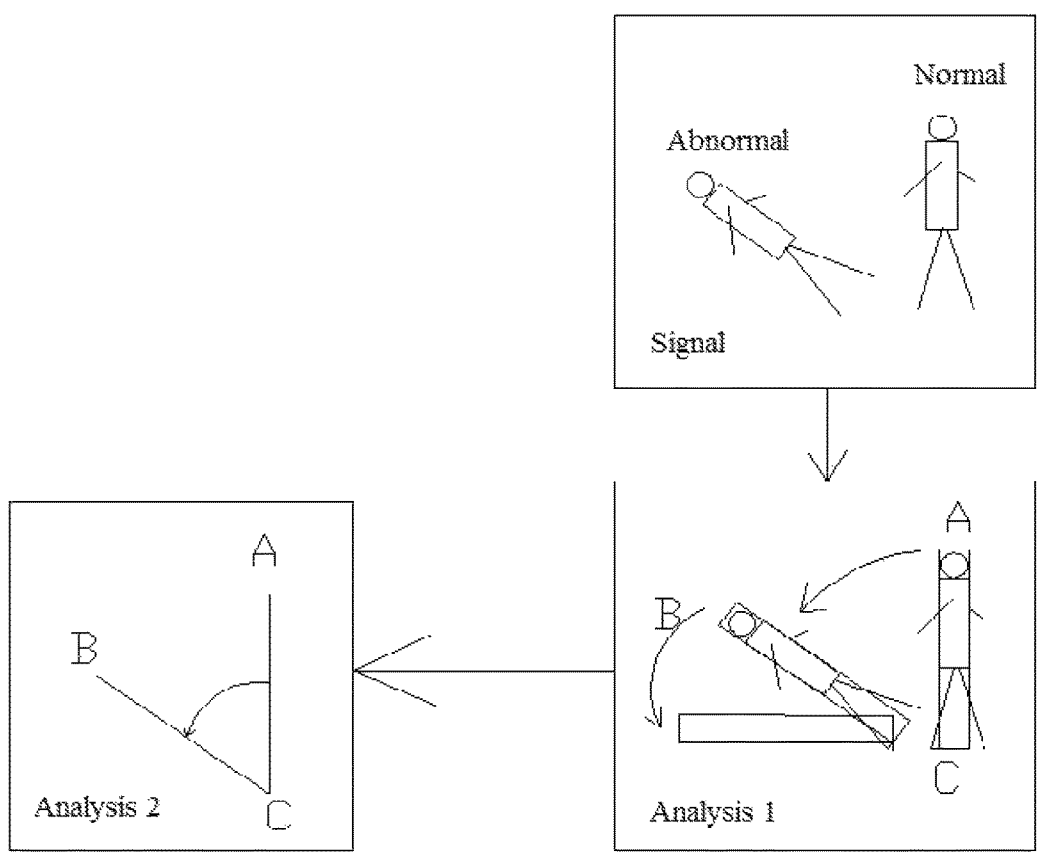
FIG. 2 is a schematic diagram of body mode analysis of the body fall smart control system of the present invention.

The video image processing of the data analysis module 32 comprises the following steps:

(1) detection of moving target: the video image is processed into an image sequence, and it is determined whether a moving target appears in each frame of the image sequence, if so, the moving target is positioned;

(2) tracking of moving target: a correspondence relationship is established between body areas in consecutive frames;

(3) feature extraction method: a contour feature point of the body is extracted to form a contour state of a certain regular shape; the contour state can have a rectangular, square, linear or other shape; this example is described by taking a rectangular shape as an example, as shown in FIG. 2; and (4) behavior identification: the contour state obtained in the step (3) is subjected to body pattern identification in a space-time zone, a 2D or 3D model is established for the identified body pattern, and a signal change speed of the modeled body pattern is tracked to determine whether the body is in a normal state or an abnormal state.

When the body is in the normal state, no further processing is performed. If the body is in the abnormal state, the change speed and/or angle of the contour state in the consecutive frames is analyzed; as shown in FIG. 2, the angular velocity, linear velocity or acceleration from the state A to the B state in the rectangular contour state can be calculated, and the angle ACB from AC to BC is calculated; and it is determined whether the change speed and/or angle reaches a set threshold, if so, it is determined that a fall has occurred. The set threshold may be one of angular velocity, linear velocity, acceleration and fall angle, or a combination thereof, such as setting a fall angle threshold ACB≥40°, and a fall change acceleration threshold a≥0.5 m/s2, and if the set thresholds are reached, it is determined that a fall has occurred.

The data analysis module 32 processes the audio signal, and may sound a voice alarm when a help signal is received or the volume reaches a certain value.

Further, in order to improve the image processing effect and the determination accuracy, the image may be pre-processed before the moving target is detected. The image pre-processing comprises the following steps: First median filtering is performed on an image to remove image noise; then a boundary contrast adaptive histogram equalization method is used to enhance the image; an open operation is used to remove image burrs that stick to the body; a Prewitt edge detection method is used to extract a contour of the image; and a comprehensive method is used to determine a grayscale threshold of the image, and the image is binarized.

The data analysis module 32 can also be connected to an execution module 5, which is connected to an external device 6 (e.g., an escalator, etc.). When it is determined that a fall has occurred, the execution module 5 is driven to control the external device 6 to stop. The corresponding braking measures can be taken at the first time.

The data analysis module 32 can also be connected to a communication module 7, which can communicate with an external device (such as a mobile phone) and send a help signal at the first time.

The present invention is simple in modeling and fast in identification, and only needs to extract a plurality of border points of the main shape of the body to form a model comparison, which is fast and efficient.

The above embodiments of the present invention are merely used to illustratively describe or explain the principles of the present invention, and do not constitute a limitation of the present invention. Therefore, any modifications, equivalent substitutions, improvements, etc., which are made without departing from the spirit and scope of the present invention, are intended to be included within the scope thereof. Besides, the appended claims of the present invention are intended to cover all the changes and modifications falling within the scope and boundary, or the equivalents thereof, of the appended claims.

What is claimed:

1. A body fall smart control system, comprising
at least one image capturing module used for capturing a video image,
an image processing module connected to the image capturing module, and
an audio capturing module used for capturing an audio signal,
wherein the image processing module is used for performing body pattern identification on the captured video image, establishing a 2D or 3D model of the identified body pattern, tracking whether a signal change speed and/or angle of the modeled body pattern reaches a set threshold value to determine whether a fall has occurred, and controlling an alarm module to sound an alarm if a fall has occurred,
wherein the alarm module sounds an alarm when the audio signal reaches a set threshold,
wherein the image processing module comprises the following steps for video image processing:
(1) detection of moving target: the video image is processed into an image sequence, and it is determined whether a moving target appears in each frame of the image sequence, if so, the moving target is positioned;
(2) tracking of moving target: a correspondence relationship is established between body areas in consecutive frames;
(3) feature extraction method: a contour feature point of the body is extracted to form a contour state of a certain regular shape; and
(4) behavior identification: the contour state obtained in the step (3) is subjected to body pattern identification and modeling in a space-time zone, and a signal change speed of the modeled body pattern is tracked to determine whether the body is in a normal state or an abnormal state; if the body is in an abnormal state, the change speed and/or angle of the contour state in the consecutive frames is analyzed, and it is determined whether the change speed and/or angle reaches the set threshold, if so, a fall is determined to have occurred, and
wherein image pre-processing is also included prior to the moving object detection, and comprises the following steps: first median filtering is performed on an image to remove image noise; then a boundary contrast adaptive histogram equalization method is used to enhance the image; an open operation is used to remove image burrs that stick to the body; a Prewitt edge detection method is used to extract a contour of the image; and a comprehensive method is used to determine a grayscale threshold of the image, and the image is binarized.

2. The body fall smart control system according to claim 1, wherein the contour state has a rectangular shape.

3. The body fall smart control system according to claim 1, wherein the image processing module is further connected to an execution module that is connected to an external device; when it is determined that a fall has occurred, the execution module is driven to control the external device to stop.

4. The body fall smart control system according to claim 1, wherein the image processing module is also connected to a communication module for communicating with the external device.

5. A body fall smart control method, wherein it comprises the following steps:
S01: at least one image capturing module is used to capture a video image;
S02: performing body pattern identification on the captured video image, establishing a 2D or 3D model of the identified body pattern, tracking whether a signal change speed and/or angle of the modeled body pattern reaches a set threshold value to determine whether a fall has occurred, and controlling an alarm module to sound an alarm if a fall has occurred;
S03: an audio capturing module is used for capturing an audio signal; and
S04: the alarm module sounds an alarm when the audio signal reaches a set threshold, wherein the step (2) comprises the following steps:

S11—detection of moving target: the video image is processed into an image sequence, and it is determined whether a moving target appears in each frame of the image sequence, if so, the moving target is positioned;

S12—tracking of moving target: a correspondence relationship is established between body areas in consecutive frames;

S13—feature extraction method: a contour feature point of the body is extracted to form a contour state of a certain regular shape; and S14—behavior recognition: the contour state obtained in the step S13 is subjected to body pattern identification and modeling in a space-time zone, and a signal change speed of the modeled body pattern is tracked to determine whether the body is in a normal state or an abnormal state; if the body is in an abnormal state, the change speed and/or angle of the contour state in the consecutive frames is analyzed, and it is determined whether the change speed and/or angle reaches the set threshold, if so, a fall is determined to have occurred, and wherein image pre-processing is also included prior to the moving object detection, and comprises the following steps: first median filtering is performed on an image to remove image noise; then a boundary contrast adaptive histogram equalization method is used to enhance the image; an open operation is used to remove image burrs that stick to the body; a Prewitt edge detection method is used to extract a contour of the image; and a comprehensive method is used to determine a grayscale threshold of the image, and the image is binarized.

* * * * *